Figure 1:
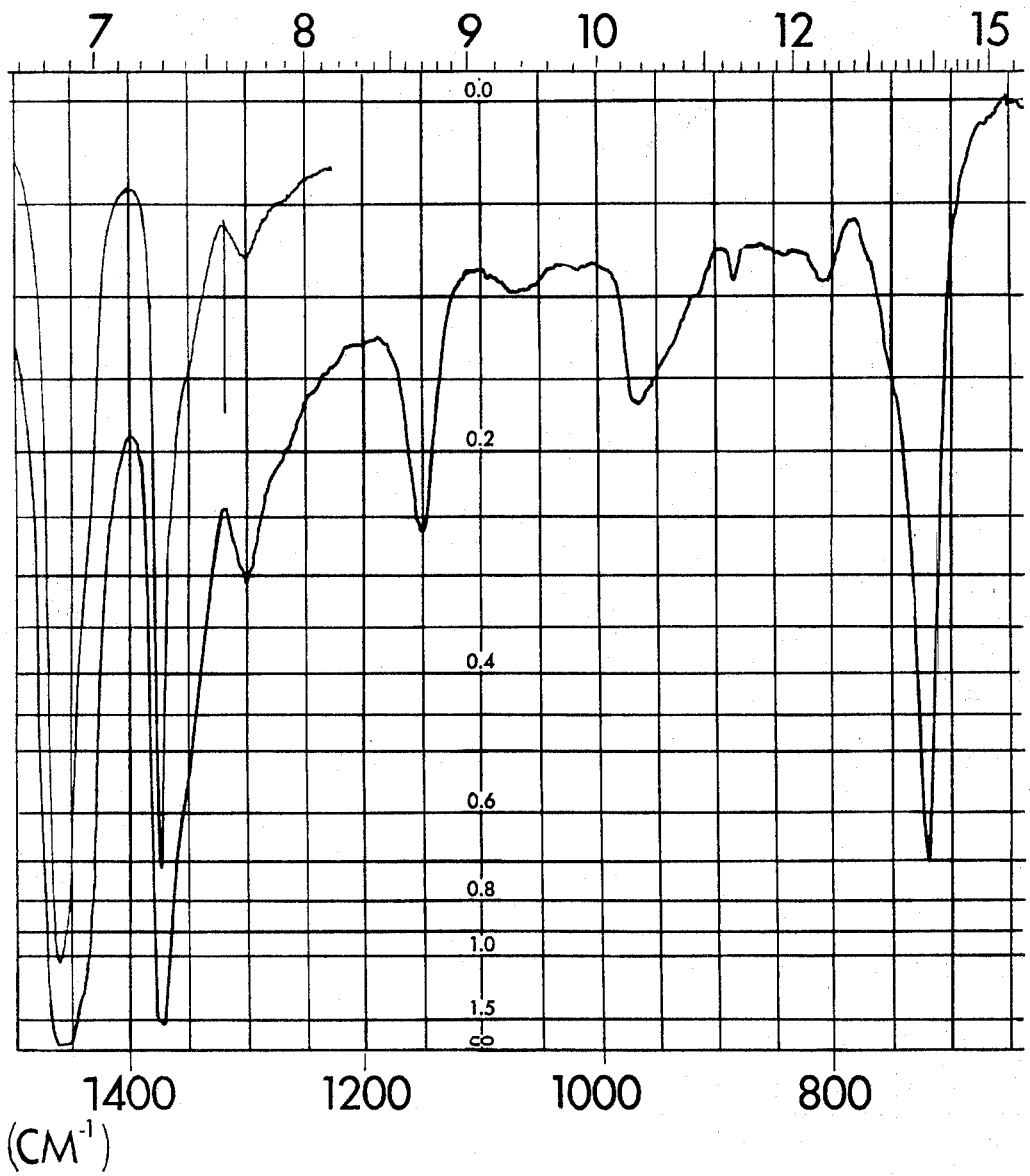

United States Patent Office 3,389,087
Patented June 18, 1968

3,389,087
LUBRICANT CONTAINING ETHYLENE-ALPHA-OLEFIN POLYMERS
Edward N. Kresge, Elizabeth, Joseph Wagensommer, Westfield, Norman Jacobson, East Brunswick, and Darrell W. Brownawell, Scotch Plains, N.J., assignors to Esso Research and Engineering Company, a corporation of Delaware
Filed Dec. 23, 1965, Ser. No. 515,934
6 Claims. (Cl. 252—59)

This invention relates to novel polymerization products of ethylene and alpha-olefins which are suitable for use as additives in oleaginous compositions and, more particularly, relates to hydrocarbon oil compositions containing certain polymerization products of ethylene and alpha-olefins, especially propylene, which exhibit a microstructure as hereinlater defined more fully. When added to oleaginous compositions, these polymerization products improve said compositions with respect to viscosity index while exhibiting thickening potencies and shear stabilities superior to conventional additives similarly employed.

An important property of an oleaginous composition is the rate at which its viscosity changes as a function of temperature. The relationship between the viscosity and temperature is commonly expressed in the art as the viscosity index (V.I.). Oleaginous compositions which change little in viscosity with variations in temperature have a greater viscosity index than do compositions whose viscosity is materially affected by changes in temperature. It is readily apparent, therefore, that one of the major requirements of lubricating oils or other hydrocarbon oil products is their satisfactory viscosity-temperature characteristics. These characteristics are necessary in order that the oils will not lose their fluidity but will show an equally good performance within a relatively wide temperature range to which they may be exposed in service. The wider the possible temperature variations, the smaller should be the change in viscosity with temperature. Hence, the viscosity-temperature characteristics of a lubricant which is used in applications where wide variations in temperature are encountered are of great importance and lubricant compositions having high viscosity indices are highly desirable.

In refining natural petroleum oils or in preparing synthetic oils, it is economically feasible to improve their viscosity index only up to a certain maximum inasmuch as further treatment has only an additional negligible effect on viscosity index characteristics. Further marked improvement can be effected, however, by adding to said compositions various types of additives for viscosity index improvement. In raising the viscosity index of oleaginous compositions by additives, recourse has been made to the introduction of long-chained compounds of the nature of linear polymers; generally the highest V.I. increase being obtained from polymers of the greatest chain length. While such polymeric products have been generally satisfactory in V.I. improvement, there has, up to the instance of the present invention, been a limit to V.I. improvement without incurring concomitant limiting factors.

For example, besides the attainment of V.I. improvement, consideration must also be given to the solubility of the polymer additive in the base composition, as well as the additive stability against breakdown under shear stresses encountered in its application. In the synthesis of polymeric V.I. agents to date, it has generally been found that solubility and shear stability are inversely proportional to the molecular weight of the polymer. Since the greatest V.I. effect has been obtained from polymers of the highest molecular weight, effectiveness has, disadvantageously, been sacrificed in order to insure proper stability in respect to resistance against shear stresses and to attain the desired solubility of the additives. Thus, the V.I. improving characteristic of additives has been undesirably restricted by limitation of one of the aforementioned characteristics.

Another feature of V.I. improvers is the amount of additive necessarily utilized in order to attain the desired V.I. improvement. This measure of effectiveness of an additive, as reflected by the amounts utilized, may be referred to as the thickening potency of the additive. It is readily apparent, therefore, that in addition to effective V.I. improvement with accompanying shear stability, solubility, etc., it is highly desirable to prepare a V.I. improver which has a thickening potency such that smaller amounts of additive as compared to amounts conventionally employed can be utilized to attain the desired improvements.

Accordingly, it is an object of this invention to provide additives which improve the viscosity-temperature characteristics of oleaginous compositions. It is also an object of this invention to provide additives which improve the viscosity-temperature characteristics of oleaginous compositions and which further exhibit exemplary shear stabilities, thickening potencies, solubilities, etc. It is a further object of this invention to provide oleaginous compositions having improved viscosity-temperature characteristics. Another object is to provide lubricant compositions having improved viscosity indices. A further object of this invention is to provide lubricant compositions which exhibit superior properties, e.g., shear stability, thickening potency, solubility, etc., in addition to improved viscosity indices. Other objects and advantages of the invention will become apparent from the following description thereof.

In accordance with this invention, the above objects, among others, are achieved by incorporating into an oleaginous composition a soluble ethylene-alpha-olefin copolymer having a microstructure characterized by a high degree of head-to-head linkages of the alpha-olefin. Particularly advantageous polymers useful in this invention exhibit a degree of crystallinity up to about 25%. The ethylene-alpha-olefin copolymers have a degree of crystallinity of which usually ranges from about 1 up to about 20% of said copolymers. It is found that copolymers having a crystallinity in excess of 25% are usually ineffectual. This may be due to the fact that not all of the higher crystallinity additive is soluble. With certain feedstocks having greater solubilizing properties copolymers of higher crystallinity may be used. The ethylene-alpha-olefin copolymers, e.g. ethylene-propylene copolymers, having the desired microstructure and degree of crystallinity may be described as crystalline-amorphous, low molecular weight, essentially unbranched random copolymers with relatively small regions of ethylene or alpha-olefin, e.g., propylene, homopolymer sequences. These polymers are produced by a method which is necessarily employed and which is more fully described hereinlater.

The polymers suitably employed in the present invention should be differentiated from conventional block copolymers which consist of long-chained segments of widely differing structure. Thus, contrary to the instance of block copolymers where long sequences of two monomers follow one another along the main polymer chain or graft copolymers where long sequences of one monomer are grafted onto a backbone of a second monomer type, the probability of finding long sequences of one monomer in the random copolymer of the instant invention is very small, except in certain isolated instances, which instances are ignored for the purpose of definition.

It is known that ethylene and/or alpha-olefins, e.g. propylene, can be polymerized at relatively low temperatures and pressure by various species of the so-called Ziegler catalyst, i.e. a transition metal compound used in combination with metal alkyls to produce elastomers having quite different properties from natural rubber. Polypropylene, as prepared by any of the recent methods, is at ordinary temperatures, a tough, resinous material, having a relatively high degree of crystallinity, and is lacking in high elasticity, high elongation at break, high resilience, and relatively low elastic modulus which characterize a rubber. However, many copolymers of ethylene with propylene are completely or almost completely amorphous and show rubber-like elasticity at room temperature and below. These polymers and copolymers are both generally unsuitable for the present purposes.

In the conventional polymerization of ethylene with propylene to make the ethylene-propylene rubbers, when the propylene combines with itself within the molecule, it forms a head-to-tail linkage. By this is meant a linkage as illustrated in the following schematic formula:

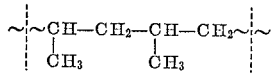

A particular embodiment of the present invention is predicated on the use of ethylene-alpha-olefin copolymers, e.g. ethylene-propylene copolymers, which have a particular microstructure evidenced by a high degree of head-to-head linkages. Such copolymers may evidence a degree of crystallinity within a specific range.

By head-to-head linkage is meant a linkage of the type illustrated in the following schematic formula wherein propylene linkage is represented:

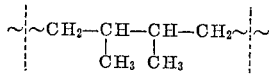

In its more generic aspects, the schematic formula can be expressed as:

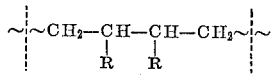

where R is a $C_1$-$C_{20}$ alkyl and preferably a $C_1$-$C_8$ alkyl radical most preferable $C_1$-$c_2$ alkyl.

Also, some tail-to-tail linkages are formed. By a tail-to-tail linkage is meant a linkage of the type illustrated in the following schematic formula wherein propylene linkage is represented:

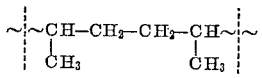

or in its more generic aspects by the schematic formula:

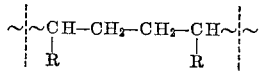

where R is as defined above.

The polymerization reaction employed to prepare the copolymers of this invention is controllable by the use of a third catalyst component, specifically, anhydrous hydrogen halide to give the desired copolymer microstructure. Upon comparison of the infrared spectra of copolymers prepared in polymerization reactions which used no hydrogen halide and polymerization reactions which did utilize hydrogen halide, it was observed that the copolymers prepared using hydrogen halide had absorbance peaks at 8.95 and 10.0 microns which indicate head-to-head sequences. The head-to-tail propylene sequences on the other hand resulted in absorption peaks at 8.7 microns. The percentage of the head-to-head sequences present in the total polymer was calculated by means of I.R. data in a manner hereinlater set forth more fully and the loss of head-to-tail propylene sequences was measured by the absorption at 8.7 microns.

It is essential to note that the polymers of this invention contain at least some quantity of head-to-head linkages. From the runs accomplished, it was apparent however, that the lower limit was about 3% head-to-head linkages and ranged as high as 80% of head-to-head linkages occurs directly without intervening ethylene groups leading to a copolymer with a much higher proportion of direct head-to-head linkages than heretofore produced.

In general, therefore, the range of head-to-head linkages in the polymers of the invention is from about 3% or less to 80% or more of the total alpha-olefin present, preferably 20% to 60% and, most preferably 30% to 50%. The remainder of the linkages generally comprise olefin, e.g. ethylene, propylene, etc., random copolymer sequences as well as some homopolymer sequences.

With regard to the degree of crystallinity of the copolymers utilized in the present invention, it was found that two independent techniques employed to determine same led to unexpectedly good experimental agreement. The two methods utilized were X-ray diffraction and differential thermal analysis.

In determining the degree of crystallinity by the X-ray diffraction method, the relative amounts of crystalline and amorphous material in the sample, are calculated by resolving the contributions of the two types of structure from the X-ray diffraction pattern. The copolymers of the instant invention evidenced a situation wherein the scattering envelope resolved into crystalline peaks which could be successfully correlated to V.I. improvement, as hereinlater substantiated by data.

When ascertaining the degree of crystallinity, the determination is usually based on comparison of the areas of the respective peaks defined by the various scattering envelope of crystalline and amorphous segments. Other methods, such as comparison of peak height may be used, however. With proper attention to experimental detail, the X-ray diffraction method provides one of the fundamental measures of crystallinity in polymers.

In differential thermal analysis, the sample and an inert reference substance, undergoing no thermal transitions in the temperature range of interest, are heated at exactly the same rate, e.g. 1–2° C. per minute, in a controlled-temperature bath. The temperature difference between sample and references measured and plotted as a function of sample temperature. The temperature difference is final only when heat is being evolved or absorbed because exothermic or endothermic activity in the sample, or when the heat capacity of the sample is changing abruptly. Since the temperature difference is directly proportional to the heat capacity, the curves resemble specifically heat curves but are inverted because, by convention, heat evolution is registered as an upward peak and heat absorption as a downward peak.

Accordingly, differential thermal analysis indicated the presence of crystallinity and X-ray diffraction patterns indicate a degree of crystallinity up to about 25% and generally a degree of crystallinity within the range of about 1 to about 20% in the copolymers of the instant invention. For the accomplishment of the objects herein, a preferable degree of crystallinity resides within the range of from about 3 to about 18% in order for the copolymers to exhibit superior potencies. This range of crystallinities is indeed surprising inasmuch as copolymers exhibiting a maximum of amorphous spectra and essentially an absence of crystalline spectra would be expected from the teachings of the prior art. Thus, in view of the relatively high propylene content employed in the preparation of such copolymers, as well as the catalysts utilized, it would have been expected that the gross low molecular weight copolymer product would exhibit a substantially complete amorphous spectrum rather than the degrees of crystallinity obtained herein. As hereinlater supported by data, the copolymers which exhibit a degree of crystallinity in accordance with the present invention attain the superior viscosity index improvement which is not attained by copolymers not exhibiting the microstructure or crystallinity of the copolymers herein.

With respect to the process of preparing the copolymers utilized in this invention, not only are copolymers having novel microstructures and degrees of crystallinity produced, but it is noteworthy that the process technique also has the advantage of greatly increasing the rate of monomer conversion and catalyst efficiency.

Broadly, the process comprises reacting from about 2 to about 98 wt. percent ethylene with about 98 to about 2 wt. percent of alpha-olefin, preferably propylene, in the presence of a soluble species of Ziegler catalyst, preferably a catalyst prepared by activating VCl$_4$ or VCl$_3$ with an alkyl aluminum chloride. Into the monomeric mixture is introduced anhydrous hydrogen halide, for example, hydrogen fluoride, hydrogen chloride, hydrogen bromide, or hydrogen iodide or mixtures thereof. The resultant product which finds utility in the present invention has a viscosity average molecular weight ($\overline{Mv}$.) of about 20,000 to 250,000 preferably from about 40,000 to 150,000 and most preferably from about 50,000 to 100,000. Unless otherwise specified, the term "molecular weight" as used herein means molecular weight based on viscosity measurement. The molecular weights indicated herein and in the claims hereof were estimated on the basis of viscosity measurement at 135° C. of solutions which contained 0.5 miligram of polymer per milliliter of Decalin.

By controlling the polymerization reaction to obtain the final products having the desired microstructure, degree of crystallinity, and the like, as described above, it is possible to prepare additives which may be employed in oleaginous compositions whose resultant viscosity indices are equal to and in most cases greater than those employing commercially available V.I. improvers, e.g., polyisobutylene having viscosity average molecular weights of between about 130,000 and 150,000. Similarly, these same novel products of this invention exhibit thickening powers greater than most of the said conventional V.I. improvers. Furthermore, the shear stabilities, as measured by percent of sonic breakdown, are far higher, i.e., better than those obtained through the use of conventionally available V.I. improvers.

A summary of typical ranges of catalyst concentrations, hydrogen halide concentrations, process variables and monomer percents in the final compositions follow. It is to be understood that due to the complexity and large number of the variable combinations possible, that some undesirable and, indeed, inoperable copolymers may result especially when the extremes of the various parameters are utilized. However, one skilled in the art should, with reasonable experimentation, be able to reproduce a copolymeric product exhibiting the physical characteristics of the ethylene-alpha-olefin copolymers of the present invention.

|  | Preferred | More Preferred | Most Preferred |
| --- | --- | --- | --- |
| Catalyst composition: Al/V, molar ratio | 0.5-25 | 1-12 | 2-7 |
| Catalyst concentration in the solvent, p.p.m. by wt. | 1-1,000 | 5-500 | 10-200 |
| Hydrogen halide concentration, mole percent; based on the total moles of monomer feed | 0.001-10 | 0.01-5 | 0.2-2.0 |
| Process Variables: |  |  |  |
| Temperature, °C | 0-200 | 0-60 | 20-55 |
| Pressures, p.s.i.g. | 0-2,000 | 0-300 | 0-100 |
| Reaction or contract time, mins. | 1-300 | 3-60 | 10-35 |
| Percent of each component in the resulting elastomer: |  |  |  |
| Wt. percent ethylene | 2-98 | 30-70 | 30-45 |
| Wt. percent propylene and/or other alpha-olefin | 2-98 | 30-70 | 55-70 |

It is the presence of the hydrogen halide in the reaction which causes the alpha-olefin, e.g. propylene to undergo considerable head-to-head addition rather than the usual head-to-tail addition. Conventional chain transfer agents taught by the art are inoperative for purposes of this invention when hydrogen halide is excluded from the system. These inoperative chain transfer agents include carbon tetrachloride, chloroform and other alkyl halides particularly where the number of carbon atoms is between 1 and 5. It is found that these agents and hydrogen have no effect in affecting the microstructure of the resultant polymers nor do they beneficially affect the rate of polymer production.

In general, the soluble catalysts used in the process of the invention can be formed by mixing an organo-aluminum halide with various vanadium compounds. These vanadium compounds are then reacted with an aluminum alkyl compound in order to produce the final catalyst composition. In the preparation of the preferred catalyst class, the following description is pertinent.

About 0.05 to 10 moles, preferably 0.15 to 1.5 moles of vanadium compound are reacted per mole of aluminum alkyl compound. The vanadium compound which is used in this invention is a vanadium oxyhalide, a vanadium tetrahalide, a vanadium oxyacetylacetonate or alkyl vanadate. The vanadium oxyhalide has the formula VOX$_3$ wherein X is a halogen having an atomic number of more than 17, i.e. chlorine, bromine, or iodine. The preferred vanadium oxyhalide is VOCl$_3$. The vanadium tetrahalide has the formula VX$_4$ wherein X is a halogen having an atomic number of more than 17, i.e. chlorine, bromine or iodine. The preferred vanadium tetrahalide is VCl$_4$.

The vanadium oxyacetylacetonate has the formula VOA$_3$, where A is the acetylacetonate radical or a haloacetylacetonate radical, the halogen being any of chlorine, bromine, iodine, or fluorine. Examples of these compounds include vanadium oxytriacetylacetonate, vanadium oxytri (trihaloacetylacetonate), and vanadium oxytri(hexahaloacetylacetonate). Preferred of this group is vanadium oxytri(acetylacetonate).

The alkyl vanadate has the formula VO(OR)$_3$ where R is a C$_1$ to C$_{12}$ alkyl group, preferably a C$_2$ to C$_6$ alkyl group. Examples of alkyl vanadates are VO(OCH$_3$)$_3$, VO(OC$_2$H$_5$)$_3$, VO(OC$_4$H$_9$)$_3$, and VO(OC$_8$H$_{17}$)$_3$. The preferred alkyl vanadate is VO(OC$_2$H$_5$)$_3$. The most preferred vanadium compound is VOCl$_3$ (vanadium oxychloride) or VCl$_4$ (vanadium tetrachloride).

The present invention also contemplates the use of copolymers prepared with certain titanium compounds. The titanium compounds suitably employed are those that can be reacted with a selected vanadium compound to produce a reaction product which is a complex as described in copending, commonly assigned application, Ser. No. 464,862, filed June 17, 1965, which application is herein incorporated by reference in its entirety although so much of it as is necessary to understand which titanium catalyst species are usable in the present invention will be repeated. The titanium compounds have the general formula Ti(OR)$_4$ where R is a C$_1$ to C$_{12}$ alkyl radical. Preferably, R is a C$_2$ to C$_6$ alkyl radical. Thus, R may be a methyl, propyl, butyl, pentyl, isopentyl, octyl, or hexyl group. Most preferably, R is a butyl group so that tetrabutyl titanate is the most preferred titanium compound. These titanium compounds are reacted with the vanadium compounds described herein excluding VCl$_4$ to produce a soluble complex. Generally, about 0.05 to 10 moles, preferably 0.15 to 1.5 moles of vanadium compound, are reacted per mole of titanium compound.

The alkyl aluminum compounds which are useful in this invention have the formula R$_m$AlX$_n$ wherein R is a C$_1$ to C$_{12}$, preferably C$_1$ to C$_8$, monovalent hydrocarbon radical, X is a halogen having an atomic number above 17 or a C$_1$ to C$_{12}$, preferably C$_1$ to C$_8$, monovalent hydrocarbon radical or hydrogen, m is an integer between 1 and 3 and the sum of m plus n is equal to 3.

Specific examples of suitable R groups include methyl, ethyl, propyl, n-butyl, n-amyl, isoamyl, phenyl, tolyl, and cyclopentyl radicals. Even more preferred are the C$_1$ to C$_5$ alkyl groups such as ethyl and butyl groups. Most preferred is ethyl. Specific examples of suitable halogens include chlorine, bromine, or iodine. The preferred halogen is chlorine.

Examples of suitable alkyl aluminum compounds include diethyl aluminum chloride, ethyl aluminum dichloride, and aluminum sesquichloride, aluminum trialkyl, aluminum monoalkyl dihalides and the like. Most preferred is diethyl aluminum chloride. Mixtures of alkyl aluminum compounds can also be suitably used. Examples of aluminum hydrides are diethyl aluminum hydride, ethyl aluminum dihydride and the like.

Ethylene and a $C_3$ to $C_{18}$ alpha-olefin can be copolymerized to prepare the additives of this invention. The alpha-olefin may be linear or branched where the branching occurs 3 or more carbon atoms from the double bond, and, while a single olefin is preferable, mixtures of these $C_3$ to $C_{18}$ olefins may be employed. Suitable examples of $C_3$ to $C_{18}$ alpha-olefins include: propylene, 1-butene, 1-pentene, 1-hexene, 1-heptene, 1-octene, 1-nonene, 1-dodecene, 4-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, 4,4-dimethyl-1-hexene, 5,6,5-trimethyl-1-heptene and mixtures thereof.

When propylene is employed as the comonomer, i.e. with ethylene, the present invention also contemplates the use of a $C_4$ to $C_{18}$ alpha-olefin and/or diolefin, polyolefin and the like which is copolymerized with ethylene and propylene in accordance with the above process to prepare terpolymers. These unsaturated monomers are also preferably linear, but may be branched where the branching occurs 3 or more carbon atoms from the double bond, and, while a single olefinic monomer is preferable, mixtures of these $C_4$ to $C_{18}$ olefinic monomers may be employed.

In preparing and using catalyst, usually all steps should be carried out in the absence of oxygen, moisture, carbon dioxide or other harmful impurities. This end is readily accomplished by blanketing all of the raw materials including the catalyst components, monomers, and inert diluents with an inert gas such as dry nitrogen or argon. Preferably, all materials are purified, e.g., by drying, distillation, etc., prior to their use.

The conditions, as hereinbefore set forth, at which the polymerization reaction is carried out can vary over a wide range. The reaction vessel utilized can be constructed of any material that is inert to the reactants and diluents used, and is capable of withstanding the operating pressures. Reaction vessels made of glass, stainless steel and glass-lined steel are quite satisfactory. Details of the polymerization process have been generally described in the art. See, for example, copending application Ser. No. 334,938.

Various solvents may be used in the copolymer preparation and they include aliphatic, naphthenic, aromatic and halogenated hydrocarbon solvents, mineral oils, or an excess of the higher alpha-olefin such as propylene may be used. Examples of solvent include n-hexane, heptane, propane, cyclohexane, toluene, xylenes, tetrachloroethylene, Decalin and chlorobenzenes, preferably, n-hexane.

The copolymers or terpolymers of this invention are employed as additives in concentrations of about 0.1 to about 10 wt. percent, preferably between about 0.5 and about 5.0 wt. percent based on the oleaginous composition being treated, so as to accomplish the desired objects. It is to be understood that such ranges are flexible and will be determined by the particular character of the oleaginous composition to which the additive is added. However, no more copolymer or terpolymer will be added than will be in solution in the oleaginous composition. Typically such additives are sold as concentrates when the additive is present in amounts of from 5 to 50 wt. percent, preferably 10 to 25 wt. percent, weight percent based on the total amount of the solvent employed for the additive, e.g., mineral oils, hexane, heptane and the like.

The copolymers or the terpolymers of the present invention can be employed alone in oleaginous compositions or, if desired, can be employed in combination with other viscosity index improvers in order to affect that characteristic of the base oleaginous composition. If desired, said copolymers or terpolymers may be employed in combination with other additives, for example, pour point depressant, detergent type additives, corrosion inhibitors, antioxidants, sludge inhibitors, metal deactivators, etc.

While the disclosure has been directed to an oleaginous composition comprised of a lubricating oil, is to be understood that the present invention also contemplates that the additives defined herein may, if desired be employed with various other oleaginous compositions such as, for example, gasoline, middle distillate fuels, transformer oils, greases, etc.

The present invention also contemplates that the copolymers or terpolymers produced by the process described herein can be subjected to such after-treatment as may be desired to fit them for particular uses or to impart desired ancillary properties. It is to be understood, therefore, that the copolymers or terpolymers utilized by the present invention can be subjected to chemical modifying treatments, such as halogenation, halogenation followed by dehalogenation, sulfohalogenation by treatment with sulfuryl chloride, or mixtures of chlorine and sulfur dioxide, sulfonation, as well as any other reaction to which hydrocarbons may be subjected. In addition, it is also contemplated that said copolymers or terpolymers can be blended with other copolymers or terpolymers so as to impart various desired properties thereto.

The following examples describe the invention more fully, both from a standpoint of the preparation of the copolymers or terpolymers and of their advantageous use in typical oleaginous compositions.

Example 1

The following example is presented in order to illustrate the method of preparing typical copolymers employed in the instant invention. This example is also presented in order to compare the results of runs when hydrogen halide is used and when not used and to illustrate the preparation of terpolymers.

A series of copolymerizations of ethylene with propylene were carried out in a one gallon stirred, stainless steel autoclave operated at 60 p.s.i.g. pressure. The catalyst system used was composed of various species of vanadium compounds with diethyl aluminum chloride, which catalyst was used in amounts of approximately 0.2 wt. percent in diluent based on diluent weight. The operating conditions and the properties of the polymer produced from each run are summarized in Table I following.

TABLE I.—PREPARATION OF POLYMERS WITH ANHYDROUS HYDROGEN HALIDE

| Run No. | Temp., °C. | Res. Time (min.) | Monomer Feed | | Cat. Feed, g./100 g. S. | Al/V, Molar Ratio | Diene Feed DCPD g./100 g. S. |
|---|---|---|---|---|---|---|---|
| | | | g./100 g. S.[1] | $C_2$, Wt. Percent | | | |
| A | 38 | 15 | 7.0 | 22 | 0.008 | 3.0 | |
| B | 38 | 15 | 7.0 | 22 | 0.008 | 3.0 | |
| C | 38 | 15 | 8.0 | 20 | 0.006 | 4.0 | |
| D | 38 | 15 | 8.0 | 20 | 0.006 | 4.0 | |
| E | 38 | 15 | 9.0 | 34 | 0.004 | 5.0 | |
| F | 38 | 15 | 9.0 | 34 | 0.004 | 5.0 | |
| G | 38 | 15 | 10.0 | 24 | 0.0063 | 7.0 | 0.255 |
| H | 38 | 15 | 10.0 | 24 | 0.0063 | 7.0 | 0.255 |
| I[2] | 35 | 13 | 11.0 | 31.9 | 0.020 | 5.1 | |
| J | 32 | 13 | 14.0 | | 0.012 | 5.0 | |

TABLE I.—PREPARATION OF POLYMERS WITH ANHYDROUS HYDROGEN HALIDE—Continued

| | HCl Feed [3] | Rate of Copolymer, g./hr. | Cat. Eff., g./gV. | Conversion | |
|---|---|---|---|---|---|
| | | | | $C_2$, Wt. percent | $C_3$, Wt. percent |
| Run No.: | | | | | |
| A | 0 | 318 | 398 | 88.4 | 33.3 |
| B | 0.40 | 385 | 482 | [4] 95 | 37 |
| C | 0 | 309 | 516 | 83.8 | 27.3 |
| D | 0.15 | 437 | 728 | [4] 95 | 44.5 |
| E | 0 | 438 | 1,095 | 86.7 | 29.1 |
| F | 0.27 | 526 | 1,315 | [4] 95 | 40 |
| G | 0 | 323 | 512 | 87.6 | 14.9 |
| H | 0.79 | 314 | 542 | 89.2 | 16 |
| I [2] | 1.2 | 890 | 445 | [4] 95 | 74.5 |
| J | 0.34 | 998 | 820 | [4] 97 | 70 |

| | Copolymer Composition $C_2$ Wt. percent | Inherent Viscosity [5] | Viscosity Avg. Mol. Wt. $(10^{-3})$ | Increase In | | Catalyst System Used |
|---|---|---|---|---|---|---|
| | | | | Cat. Eff., percent | $C_3$ Conv., percent | |
| Run No.: | | | | | | |
| A | 42.8 | 375 | 290 | | | } $VOCl_3Et_2AlCl$ |
| B | [6] 38.0 | 1.35 | 77 | 21 | 11 | |
| C | 44.4 | 4.05 | 320 | | | |
| D | [6] 34.7 | 1.30 | 75 | 41 | 63 | |
| E | 60.6 | 4.10 | 280 | | | } $VCl_4Et_2AlCl$ |
| F | [6] 55.2 | 1.67 | 85 | 20 | 37 | |
| G | 63.0 | 2.65 | 150 | | | } $VCl_4Et_2AlCl$ |
| H | 62.7 | 2.30 | 122 | 6 | 11 | |
| I [2] | | | | | | $VOCl_3Et_2AlCl$-HBr |
| J | | | | | | $VCl_4Et_2AlCl$ |

[1] All runs were made at 60 p.s.i.g. pressure in normal hexane solvent.
[2] Anhydrous HBr feed, wt. percent based on total monomer feed.
[3] Anydrous HCl feed, wt. percent based on total monomer feed.
[4] Assumed ethylene conversion.
[5] Decalin viscosity at 135° C.
[6] Calculated ethylene.
Symbols and abbreviations: g.=grams; Res.=Residence; S.=Solvent; DCPD=Dicyclopentadiene.

From the above tabulated data it can be seen that the use of the hydrogen halide usually results in a considerable increase in the rate of copolymerization, percent of both $C_2$ and $C_3$ conversion, catalyst efficiency and a decrease in the inherent viscosity of the copolymer produced. Note that Run I which used HBr gave results equivalent to those obtained using HCl. Also, it should be observed that terpolymers can be satisfactorily prepared with most dienes such as dicyclopentadiene.

Figure 2:
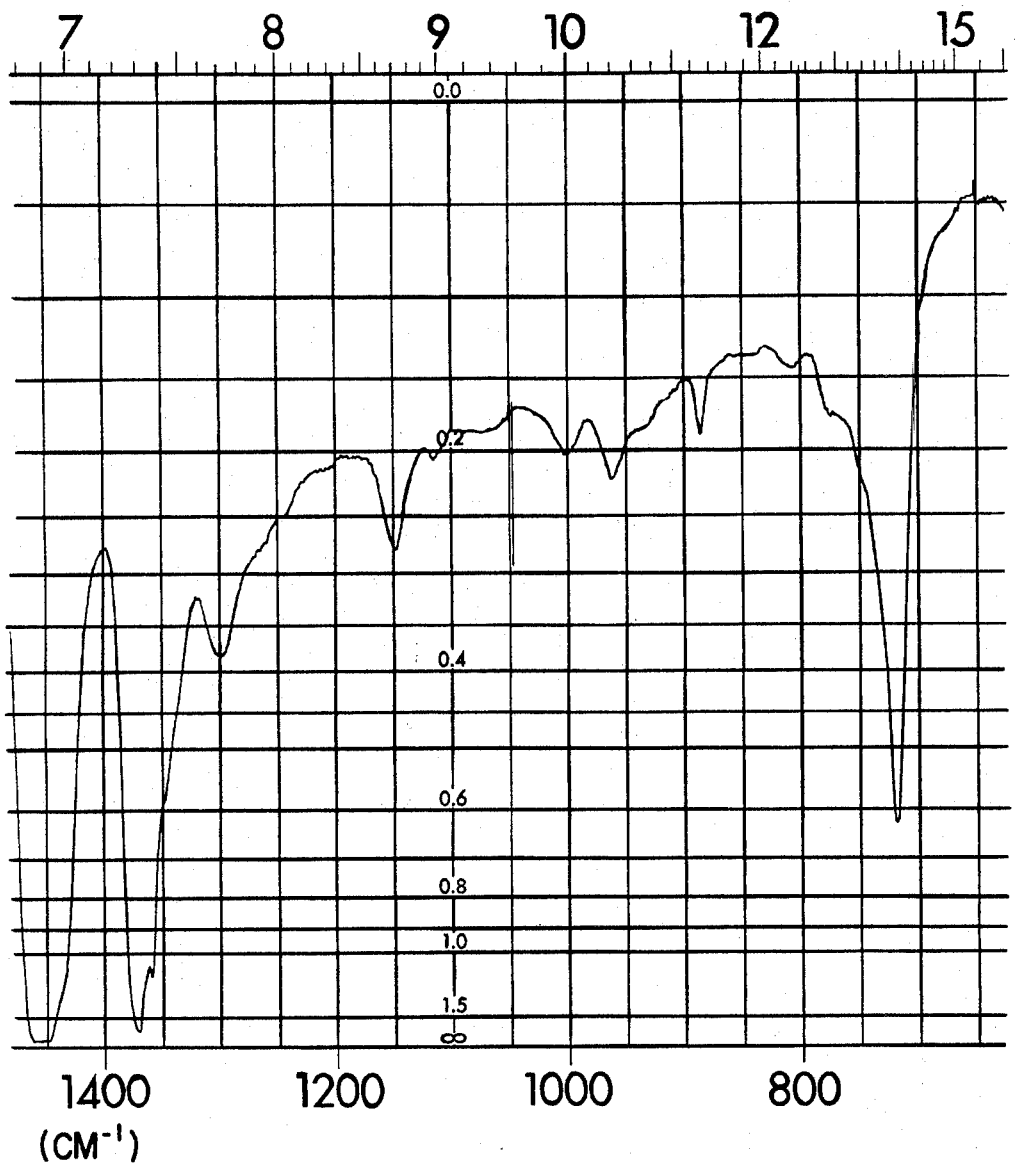

Infrared spectra of the copolymers obtained in Run E which used no hydrogen halide and Run F which did utilize hydrogen halide were prepared for comparison purposes. The infrared spectra for Run E is shown in FIGURE 1 of the drawing and that of Run F is shown in FIGURE 2 of the drawing. In examining these infrared spectra, it can be seen that FIGURE 2 has a weak peak at about 8.9 and a strong peak at about 10.0 microns which indicate head-to-head sequences. The percentage of these sequences present in the total polymer can be calculated from the I.R. spectra data.

Example 2

This example serves to illustrate a method of calculating the estimated head-to-head linkages contained in an ethylene/propylene copolymer utilized by the present invention. The method employed is that described in "Spectroscopic Analysis of Ethylene-Propylene Copolymers" by Harry V. Drushel and Frank A. Iddings, Analytical Chemistry, 35, 28 (1963).

In this example, a sample was prepared by evaporating a solution of the polymer (reactor cement) on a suitable KBr pellet. A NaCl plate may be employed instead of the KBr pellet or, if desired, the sample may also be prepared by pressing a thin film with a hydraulic press.

An infrared spectrum of the prepared sample film was recorded between 5000 cm.$^{-1}$ ($2\mu$) and 650 cm.$^{-1}$ ($15\mu$). The ratio of the band intensities at 1150 cm.$^{-1}$ ($8.7\mu$) and 720 cm.$^{-1}$ ($13.9\mu$) was used for the analysis. Absorption at 1150 cm.$^{-1}$ is derived from the propylene units (methylene wagging frequency) and absorption at 720 cm.$^{-1}$ is derived from ethylene units (methyl chain rocking frequency). The thus obtained ratios were applied to a calibration curve prepared from $C_{14}$-labeled standard copolymer samples and it was determined that the sample being assayed contained 51% ethylene and 7% propylene having head-to-tail linkage.

The amount of head-to-head propylene linkage may be represented as the remainder from the total linkages, i.e. 100%, after the amount of ethylene linkage, i.e. 51%, and head-to-tail propylene, i.e. 7%, have been subtracted therefrom. In other words, the percentage of head-to-head propylene linkage equals 100% minus (51% $C_2$ plus 7% $C_3$ H-T-T) or 42% propylene head-to-head linkage.

It is essential to note that the polymers utilized by this invention generally contain a significant quantity of head-to-head linkages. From the examples accomplished, it was determined that the average appears to be about 30 to 50% head-to-head linkages.

In the present invention the preponderance of head-to-head-linkages occur directly without intervening ethylene groups leading to a copolymer with a much higher proportion of direct head-to-head linkages than has ever been produced before.

It is also to be noted that when $VOCl_3$ is used in the system of the present invention without HCl there are no peaks at about 8.95 microns and about 10.0 microns which would indicate head-to-head linkages. See FIGURE 1. These peaks only occur after the use of HCl. See FIGURE 2.

Example 3

In order to demonstrate that compounds known to the art as chain-terminating agents are not operable in the preparation of the copolymers of this invention, i.e. characterized by a high degree of head-to-head linkages etc., a series of copolymerizations of ethylene with propylene were carried out in a one gallon stirred stainless steel autoclave operated at 60 p.s.i.g. pressure. The catalyst system used was composed of various species of vanadium compounds with diethyl aluminum chloride, which catalyst was used in amounts of approximately 0.2 wt. percent in diluent based on diluent weight. The operating conditions and the properties of the polymer produced from each run are summarized in Table II following:

viscosity index and thickening potency. The resulting data are set forth in Table III.

TABLE II

| Run No.: | Temp., °C. | Res. Time (min.) | g./100 g. S. | C₂, Wt. Percent | Cat. Feed, g./100 g. S. | Al/V, Molar Ratio | Diene Feed | Chain Terminating Agent | Rate of Copolym., g./hr. | Cat. Eff., g./g. V. |
|---|---|---|---|---|---|---|---|---|---|---|
| K | 38 | 9 | 11.1 | 22 | 0.006 | 6.0 | | 0 | 663 | 740 |
| L | 38 | 9 | 11.1 | 22 | 0.006 | 6.0 | | ¹ 4 | 680 | 755 |
| M | 38 | 14 | 9.0 | 30 | 0.006 | 5.5 | 0.18 | | 418 | 698 |
| N | 38 | 14 | 9.0 | 30 | 0.006 | 5.5 | 0.18 | (²) | 368 | 613 |
| O | 38 | 14 | 9.2 | 26 | 0.0065 | 4.3 | 0.19 | | 1,112 | 570 |
| P | 38 | 14 | 9.2 | 26 | 0.0065 | 4.3 | 0.19 | (³) | 940 | 482 |

| Run No.: | Conversion C₂, Wt. Percent | Conversion C₃, Wt. Percent | Polymer Composition C₂, Wt. Percent | Inherent Viscosity | M̄v.×10⁻³ | C₃, Head-to-Head Linkage (I.R.) | Catalyst | Catalyst System Used |
|---|---|---|---|---|---|---|---|---|
| K | 91 | 25.5 | 50.1 | 3.0 | 198 | ⁴ 0 | Control Run | VCl₄ |
| L | 92 | 26.4 | 49.6 | 2.2 | 130 | ⁴ 0 | With Hydrogen | Et₂AlCl |
| M | 85 | 30 | 54.9 | 3.9 | 266 | ⁴ 0 | Control Run | VCl₄ |
| N | 84.5 | 22 | 62.0 | 2.9 | 170 | ⁴ 0 | With 1-butene | Et₂AlCl |
| O | 93 | 22 | 60.0 | 3.4 | 230 | ⁴ 0 | Control Run | VOCl₃/Ti |
| P | 90 | 14 | 69.2 | 3.3 | 193 | ⁴ 0 | With Diisobutylamine | (OC₄)₄Et₂AlCl |

¹ H₂:4 p.p.m. of solvent.
² Butene-1 feed:2.0 g./100 g. solvent.
³ Diisobutylamine feed:0.00086 g./100 g. solvent.
⁴ Approximate.
Symbols and abbreviations: g.=grams; Res.=Residence; S.=Solvent.

As can be seen from the above Table III, three pairs of runs were carried out, each pair consisting of a control run and a run with a chain-terminating agent. The chain-terminating agents were hydrogen, butene-1 and diisobutylamine. It is apparent from the above runs, that the addition of the chain-terminating agent resulted in products having propylene head-to-head linkages outside of the scope of this invention as well as molecular weights outside of the preferred range. Further, no increase in conversion percentage or in rate of polymerization except for an insignificant amount for the hydrogen run. Moreover, in the butene-1 and the diisobutylamine runs, the copolymerization rates and the rate of monomer conversions were less than for the control runs.

Example 4

The following example is presented to illustrate the V.I. improving potencies as well as the increased thickening powers of the copolymers of the present invention. In this example, seven runs were accomplished at constant catalyst feed rates, and aluminum to vanadium ratios. Two levels of HCl addition, i.e. 10 and 15 cc./min. were utilized.

Heptane was saturated with ethylene and propylene in a molar ratio as indicated in the table presented hereinlater. The saturated heptane was fed into a reaction vessel where a stream of vanadium oxychloride and a stream of diethyl aluminum chloride, each diluted with heptane, was introduced so as to provide an aluminum to vanadium ratio about 4:1. Nitrogen gas containing hydrogen chloride was fed into the reaction vessel in amounts of 10 or 15 cc./min. as indicated in the following table. The residence time of the reaction mixture was about 15 minutes. The temperature of the reaction was maintained at about 30° C. and at a pressure of about 1 atmosphere. The reaction mixture was subsequently washed and steam stripped.

The recovered copolymers were incorporated in amounts of from about 1.5 to 3.0 wt. percent into a base oil, i.e., a solvent-extracted, neutral, paraffinic type oil of about 46.53 SUS at 210° F. and about 189.9 SUS at 100° F. having a viscosity index of about 109, in order to determine the ability of such copolymers to improve viscosity index and thickening potency. The resulting data are set forth in Table III.

TABLE III.—ETHYLENE-PROPYLENE COPOLYMER ADDITIVES

| Ethylene/Propylene Feed Ratios | HCl Feed Rate (cc./min.) 10 | | HCl Feed Rate (cc./min.) 15 | |
|---|---|---|---|---|
| | V.I. | Thickening Power ¹ | V.I. | Thickening Power ¹ |
| 50/50 | 130 | 1.0 | 145 | 1.0 |
| 55/45 | 136 | 1.4 | 132 | 1.6 |
| 60/40 | 140 | 1.6 | 136 | 1.1 |
| 65/35 | 133 | 1.6 | | |

¹ Thickening Power=Wt. percent polyisobutylene÷Wt. percent ethylene/propylene required to thicken base oil to a KV₂₁₀=12±0.5 cs.

Reference to the viscosity indices and thickening potencies clearly indicates an advantageous improvement over conventional V.I. improvers. Such improvement is more apparent from the data of the following example wherein additive in accordance with the present invention are compared with a conventional additive, e.g. polyisobutylene and utilizing a variety of base oil stocks.

Example 5

In order to illustrate the improvement in viscosity index potency exhibited by the ethylene/propylene copolymers of the instant invention, a number of copolymers were prepared in a manner similar to that of Example 6 except for the mole ratio of ethylene to propylene employed. In each run employing ethylene and propylene, the mole percent of ethylene employed is set forth in the following Table IV. In each instance, enough copolymer was added to thicken the base stock to a viscosity of 12± 0.5 cs. at 210° F. The base stocks utilized are identified in the table.

TABLE IV.—V.I. COMPARISON OF ETHYLENE PROPYLENE COPOLYMERS (EPC) WITH POLYISOBUTYLENE

| V.I. Improver Copolymer | Mole Percent of Ethylene | Base stock A | Base stock B | Base stock C |
|---|---|---|---|---|
| None | | 104 | 109 | 99 |
| Run 1 | 77 | 139 | 137 | 134 |
| Run 2 | 71 | 137 | 136 | 132 |
| Run 3 | 80 | 143 | 130 | 132 |
| Run 4 | 77 | 139 | 134 | 134 |
| Polyisobutylene (Paratone N) | | 130 | 128 | 124 |

Base Stocks:
A=A solvent extracted, neutral, paraffinic type oil of about 44.52 SUS at 210° F. and 166 SUS at 100° F.
B=A solvent extracted, neutral, paraffinic type oil of about 46.53 SUS at 210° F. and 189.9 SUS at 100° F.
C=A solvent extracted, neutral, paraffinic type oil of about 44.10 SUS at 210° F. and 166 SUS at 100° F.

The data of Table IV indicate a significant improvement in viscosity index potency of the ethylene/propylene copolymers of this invention when compared with a conventional viscosity index improver. This advantage is further amplified by consistent effectiveness in the variety of different base stocks employed.

Example 6

A number of continuous runs were effected in order to illustrate the capability of the process of the present invention to prepare copolymers which exhibit consistent V.I. improvement. The copolymers utilized in all of the runs were prepared in a manner similar to that set forth in the preceding disclosure and examples. The reactants, as well as reaction conditions are set forth in the following Table V in which the potencies of the copolymers are also set forth. The copolymers were incorporated in amounts of about 2.0 wt. percent in a paraffinic type base oil of about 46.53 SUS at 210° F. and about 189.9 SUS at 100° F. having the viscosity index of about 109.

TABLE V

| Run No. | Temp., °C. | Feeds, gms./100 gms. hexane | | | | Al/V, Molar Ratio | Rate, g./hr. | V.I. | P[1] | Percent SB.[2] |
|---|---|---|---|---|---|---|---|---|---|---|
| | | $C_2$ | $C_3$ | $VOCl_3$ | HBr | | | | | |
| 1A | 35 | 3.50 | 7.50 | .020 | 0.9 | 4.5 | 850 | 138 | 1.3 | 20 |
| 1B | 35 | 3.50 | 7.50 | .020 | 1.4 | 4.5 | 890 | 142 | 1.3 | |
| 1C | 35 | 3.50 | 7.50 | .020 | 2.0 | 4.5 | 865 | 141 | 1.3 | |
| 2A | 35 | 3.50 | 7.50 | .020 | 1.25 | 4.5 | 876 | 138 | 1.3 | 16 |
| 2B | 40 | 3.50 | 7.50 | .020 | 1.25 | 4.5 | 870 | 135 | 1.2 | |
| 3A | 35 | 3.50 | 7.50 | .020 | 1.25 | 5.0 | 873 | 139 | 1.2 | 18 |
| 3B | 35 | 3.50 | 7.50 | .020 | 1.25 | 5.5 | 883 | 143 | 1.2 | |
| 4A | 35 | 3.50 | 7.50 | .025 | 1.25 | 4.5 | 907 | 138 | 1.2 | 17 |
| 4B | 35 | 3.50 | 7.50 | .020 | 1.25 | 4.5 | 884 | 137 | 1.3 | |
| 4C | 35 | 3.50 | 7.50 | .0125 | 1.25 | 4.5 | 814 | 133 | 1.4 | |
| 5A | 35 | 3.50 | 7.50 | .020 | 1.1 | 5.1 | 908 | 136 | 1.2 | 19 |
| 5B | 35 | 3.50 | 7.50 | .020 | 1.4 | 5.1 | 912 | 143 | 1.3 | 21 |
| 5C | 35 | 3.50 | 7.50 | .020 | 2.0 | 5.1 | 906 | 144 | 1.2 | 20 |
| 5D | 35 | 4.00 | 7.50 | .020 | 1.25 | 5.1 | 960 | 139 | 1.3 | 18 |

[1] Thickening potency as compared polyisobutylene.
[2] Percent sonic breakdown.

The above data show that copolymers exhibiting improved V.I., thickening potency and shear stability as determined by sonic breakdown are achieved by utilizing hydrogen bromide with the catalyst system of the present invention. The V.I.'s indicated in Table V are consistently much higher than the potencies of conventional V.I. improvers. This advantage is buttressed by the thickening potencies which permit use of less additive and by the improved shear stability which makes for a better product.

Example 7

This example is presented in order to compare the effectiveness of the copolymers prepared with hydrogen halide in accordance with the present invention with copolymers prepared without the use of hydrogen halide.

The reaction conditions utilized are set forth in the following Table VI, as are the ratios of ethylene ($C_2$) to propylene ($C_3$).

TABLE VI.—COMPARISON OF ETHYLENE-PROPYLEN COPOLYMERS[1]

| | $C_2$, g./min. | $C_3$, g./min. | HCl[2], mg./min. | V.I. | Percent, S.B. |
|---|---|---|---|---|---|
| Run No.: | | | | | |
| 1 | 1.30 | 1.59 | 0 | (3) | |
| 2 | 1.22 | 1.69 | 0 | 128 | 72.2 |
| 3 | 1.14 | 1.75 | 0 | 126 | 63.5 |
| 4 | 1.22 | 1.69 | 29.8 | 140 | 8.5 |
| 5 | 1.22 | 1.69 | 29.8 | 138 | 8.8 |
| 6 | 1.30 | 1.59 | 38.8 | 140 | 20.5 |
| 7 | 1.15 | 1.75 | 50.7 | 137 | 18.5 |

[1] The reactor conditions were as follows: Temp., 27 °C., Catalyst= Et$_2$AlCl (11.3 mg./min.) VOCl$_3$ (3.53 mg./min.); Mole ratio=4.57, and Solvent=Heptane, 40 cc./min.
[2] Used at 25% concentration (nitrogen making up the balance where applicable).
[3] Gel.

The foregoing data indicate a problem encountered when HCl is not employed, i.e. possible gel formation. While the remaining runs wherein no HCl was employed indicate somewhat satisfactory V.I. improvement, it must be noted that the shear stability, as represented by sonic breakdown was extremely high and thus undesirable. This is readily apparent when these copolymers having high percent sonic breakdown are compared with similar copolymers except for HCl modification.

Example 8

This example represents a series of runs effected under substantially identical conditions except for modifications of the HCl addition rate. The reactants and reaction conditions are set forth in Table VII. The resulting V.I., thickening potencies, and shear stability as represented by a percent sonic breakdown are compared with polyisobutylene a conventional V.I. improver (Paratone N).

TABLE VII.—ETHYLENE-PROPYLENE COPOLYMER AS V.I. IMPROVERS[1]

| Run No. | HCl[2] (mg./min.) | V.I.[3] | Thickening Potency[4] | Percent, S.B. |
|---|---|---|---|---|
| Run No.: | | | | |
| 1 | 20.7 | 137 | 1.5 | 20.6 |
| 2 | 20.7 | 139 | 1.2 | |
| 3 | 14.7 | 138 | 1.7 | 16.7 |
| 4 | 14.7 | 135 | 1.5 | |
| 5 | 8.4 | 135 | 1.8 | 13.5 |
| 6 | 8.4 | 137 | 1.8 | |
| 7 | 0.72 | 130 | 2.9 | 48.4 |
| 8 | 0.72 | 132 | 2.8 | |
| 9 | 0.72 | 131 | 2.7 | |
| Polyisobutylene (Paratone N) | | 130 | 1.0 | 25.0[1] |

[1] With the exception of the HCl addition rate, the following variables were identical for all the reactions. Temp., 27° C.; Monomers: C$_3$=1.5 g./min., C$_2$=1.3 g./min.; Catalyst: Et$_2$AlCl=11.3 mg./min., VOCl$_3$ 3.53 mg./min., Mole Ratio on 4.57:1; Solvent: Heptane, 40 cc./min.
[2] 24 Vol. percent HCl/N$_2$.
[3] Determined in Ref. Oil 150A; A solvent extracted, neutral, paraffinic type oil of about 46.53 SUS at 210° F. and 189.9 SUS at 100° F.
[4] Thickening potency as compared to polyisobutylene.

The foregoing data illustrate that effective V.I. improvement, as well as improved thickening potencies and shear stabilities can be consistently obtained employing the copolymers of the present invention. While copolymers which were prepared from a reaction utilizing a feed rate of 0.72 mg./min. of HCl did not evidence outstanding characteristics, it is obvious that such amount of HCl represents a relatively minute amount in comparison with the amounts generally utilized and, accordingly, represents an extremity of the operable parameter.

Example 9

This example serves to illustrate the correlation between the degree of crystallinity of a copolymer of the instant invention and its potency as a V.I. improver. In this example, a number of ethylene/propylene copolymers were examined for their degrees of crystallinity by X-ray diffraction. The procedure utilized was similar to that of Weidinger and Hermans, Makromolekular Chem., 50, 98 (1961). The method of determining the crystalline fraction in the ethylene/propylene polymer consisted of:

(1) Obtaining a diffractogram of the ethylene/propylene copolymer sample.

(2) Measuring the amorphous and crystalline areas of the diffractogram.

(3) Calculating the percent crystallinity from these two measurements.

The method is based upon taking a series of diffractograms of ethylene/propylene copolymer samples that vary in crystallinity. The data is normalized to the same absorbance. A plot of the normalized crystalline area versus the normalized amorphous gives a linear relation between the two quantities. This allows the calculation of the crystalline fraction in any other sample from the observed crystalline and amorphous areas.

The V.I. of each of these ethylene/propylene copolymer samples were determined and the resulting data in terms of percent crystallinity and V.I. are presented in Table VIII.

TABLE VIII

| Sample No. | Catalyst System | Calculated Ethylene (wt. percent) | V.I. | Percent Crystallinity (X-ray) |
|---|---|---|---|---|
| 1 | $VOCl_3 \cdot AlEt_2Cl \cdot HCl$ | (1) | 128 | 0 |
| 2 | $VOCl_3 \cdot AlEt_2Cl \cdot HCl$ | (1) | 128 | 0 |
| 3 | $VOCl_3 \cdot AlEt_2Cl \cdot HBr$ | (1) | 132 | 4.2 |
| 4 | $VCl_4 \cdot AlEt_2Cl \cdot HBr$ | 40.3 | 136 | 5.7 |
| 5 | $VOCl_3 \cdot AlEt_2Cl \cdot HCl$ | 47.0 | 136 | 5.8 |
| 6 | $VOCl_3 \cdot AlEt_2Cl \cdot HCl$ | 39.0 | 138 | 6.2 |
| 7 | $VOCl_3 \cdot AlEt_2Cl \cdot HCl$ | 35.0 | 133 | 6.4 |
| 8 | $VOCl_3 \cdot AlEt_2Cl \cdot HBr$ | 38.8 | 150 | 8.9 |
| 9 | $VOCl_3 \cdot AlEt_2Cl \cdot HCl$ | 35.3 | 152 | 12.1 |
| 10 | $VOCl_3 \cdot AlEt_2Cl \cdot HCl$ | 40.8 | 162 | 18.6 |
| 11 | $VOCl_3 \cdot AlEt_2Cl \cdot HCl$ | 41.7 | 165 | 19.9 |

1 Est. 30–50 weight percent.

Figure 3:
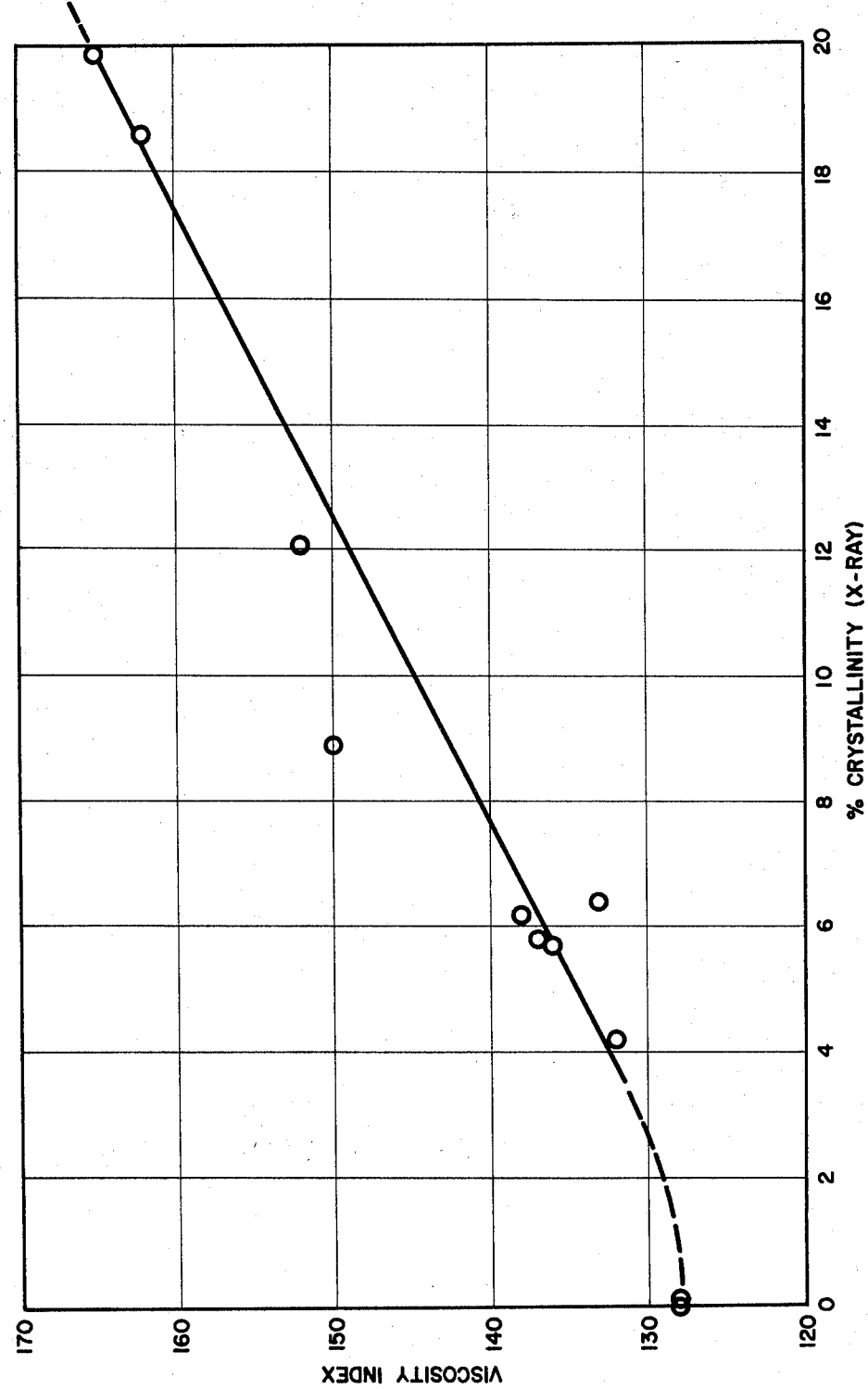

The data represented in Table VIII are presented in graphical form in FIGURE 3, incorporated herein by reference. Such graphical representation illustrates a definite correlation between degree of crystallinity of ethylene/propylene copolymers and their effectiveness as V.I. improvers. This is surprising inasmuch as it is usually suggested that polymeric V.I. improvers should be prepared with the objective of making them oil-soluble and non-crystalline in order to be capable of imparting the desired properties. On the other hand, the data of Table VIII and FIGURE 3 illustrate various ethylene/propylene copolymeric products which exhibit a relatively high degree of crystallinity and concomitant impressively high viscosity index improvement. It is noteworthy that this V.I. improvement is accompanied by advantageous thickening potencies and shear stabilities. It is also noteworthy that the catalyst system utilized, the olefin contents, etc., do not, from the above data, appear to have any significant affect on the V.I.-crystallinity correlation.

It is not intended that this invention be limited to the specific examples presented by way of illustration. The scope of the invention is limited only by the appended claims.

What is claimed is:

1. An oil composition comprising a major proportion of a lubricating oil and from about 0.1 to about 10 wt. percent of an oil-soluble, amorphous-crystalline polymer comprised of 2–98 wt. percent ethylene and 2–98 wt. percent of a $C_3$–$C_{18}$ alpha-olefin, said polymer having a molecular weight within the range between about 20,000 and 250,000, a degree of head-to-head linkages within the range between about 20% and 60% and a degree of crystallinity up to about 25%.

2. A composition of matter comprising a major proportion of a lubricating oil and between about 0.1 and about 10 wt. percent of an oil-soluble, amorphous-crystalline ethylene-propylene copolymer containing 30–70 wt. percent ethylene and having 30% to 50% of head-to-head linkages as signified by absorption in the infrared spectra at 8.95 and 10.0 microns.

3. A composition of matter comprising a major proportion of a lubricating oil and from about 0.1 to about 10 wt. percent of an ethylene-alpha-olefin polymer prepared by copolymerizing a feed comprised of 2–98 wt. percent ethylene and 2–98 wt. percent of a $C_3$–$C_{18}$ alpha-olefin in the presence of from 0.001 to about 10 mole percent, based on the total moles of monomer feed, of hydrogen halide.

4. The composition of claim 3 in which said polymerization feed also contains a third monomer selected from the group consisting of a $C_3$–$C_{18}$ alpha-olefin and dicyclopentadiene.

5. The composition of claim 3 wherein the hydrogen halide is hydrogen chloride.

6. The composition of claim 3 wherein the hydrogen halide is hydrogen bromide.

References Cited
UNITED STATES PATENTS

| | | | |
|---|---|---|---|
| 2,959,576 | 11/1960 | Payne | 260—94.9 |
| 3,004,962 | 10/1961 | Matlack. | |
| 3,121,064 | 2/1964 | Patat et al. | |
| 3,166,542 | 1/1965 | Orzechowski et al. | 260—59 |
| 3,112,297 | 11/1963 | Gordon et al. | 252—59 X |
| 3,222,333 | 12/1965 | Duck et al. | 260—88.2 X |
| 3,242,149 | 3/1966 | Giachetti et al. | 260—88.3 |
| 3,265,622 | 8/1966 | Anderson | 252—59 |
| 3,278,643 | 10/1966 | Achon | 260—88.2 |

DANIEL E. WYMAN, *Primary Examiner.*

W. H. CANNON, *Assistant Examiner.*